United States Patent
Liu et al.

(10) Patent No.: US 9,378,530 B2
(45) Date of Patent: Jun. 28, 2016

(54) SMART SOCKET FOR AUTOMATICALLY SWITCHING BETWEEN ELECTRICITY UTILIZATION MODES

(71) Applicant: D-Link Corporation, Taipei (TW)

(72) Inventors: Ming-Han Liu, Taipei (TW); Wei-Chung Hsu, Taipei (TW); Jun-Hao Huang, Taipei (TW); Jia-Jun Chen, Taipei (TW)

(73) Assignee: D-LINK CORPORATION, Taipei (TW)

( * ) Notice: Subject to any disclaimer, the term of this patent is extended or adjusted under 35 U.S.C. 154(b) by 396 days.

(21) Appl. No.: 14/168,603

(22) Filed: Jan. 30, 2014

(65) Prior Publication Data
US 2015/0130275 A1 May 14, 2015

(30) Foreign Application Priority Data

Nov. 12, 2013 (TW) .............................. 102140999 A

(51) Int. Cl.
| | |
|---|---|
| *G06Q 50/06* | (2012.01) |
| *H04L 12/12* | (2006.01) |
| *H02J 3/38* | (2006.01) |
| *H02J 7/34* | (2006.01) |
| *H02J 13/00* | (2006.01) |

(52) U.S. Cl.
CPC ................. *G06Q 50/06* (2013.01); *H02J 3/382* (2013.01); *H02J 7/34* (2013.01); *H02J 13/0079* (2013.01); *Y10T 307/344* (2015.04)

(58) Field of Classification Search
USPC ...................................... 307/23, 65
See application file for complete search history.

(56) References Cited

U.S. PATENT DOCUMENTS

2012/0286574 A1* 11/2012 Sawada ..................... H02J 1/10
307/23

* cited by examiner

*Primary Examiner* — Robert Deberadinis
(74) *Attorney, Agent, or Firm* — Bacon & Thomas, PLLC

(57) ABSTRACT

The present invention is to provide a smart socket, which includes a timing unit for obtaining current time; a power receiving/output unit for receiving electricity from an external power supply or outputting electricity to a power storage device; an electricity quantity monitoring unit for detecting power value of electricity received from the power receiving/output unit; a home appliance power supply unit and an electricity selling power supply unit for transmitting electricity to an electronic device and an electricity purchaser circuit, respectively; a switching unit connected to the electricity quantity monitoring unit, home appliance power supply unit and electricity selling power supply unit, and being set with a home appliance mode, a power storage mode and an electricity selling mode; and a processing unit connected to the timing unit, electricity quantity monitoring unit and switching unit for switching mode of the switching unit according to the current time and power value.

7 Claims, 3 Drawing Sheets

SMART SOCKET FOR AUTOMATICALLY SWITCHING BETWEEN ELECTRICITY UTILIZATION MODES

FIELD OF THE INVENTION

The present invention relates to a smart socket, more particularly to a smart socket capable of receiving electricity from an external power supply device and switching mode thereof to a home appliance mode, a power storage mode or an electricity selling mode according to a current time data and a power value of the electricity passing therethrough (which clearly reflect the user's electricity utilization habits), so as to significantly reduce the user's cost of electricity consumption.

BACKGROUND OF THE INVENTION

Electricity is the cornerstone of modern life and also a driving force for economic development. In the traditional industries, such as printing plants, textile factories, steel mills, petrochemical plants, etc., as well as in the emerging high-tech industries, such as semiconductor plants, LCD panel plants, etc., electricity is invariably the power for driving production lines and various equipment. In addition, almost every household needs electricity for items such as lamps, electric water heaters, televisions, air conditioners, refrigerators, etc. in order to lead a quality life.

However, with the depletion of available energy and the growing demand for electricity, governments all over the world have advocated that either electricity bills be charged according to a time-of-use rate or power companies buy electricity from the private sector to reduce the load on the power companies and to lower the pressure of the need to build more power plants. Apart from that, many households have their own solar or wind power generators installed to produce electricity for their own use, thereby reducing electricity expenses. Nevertheless, whether people sell excessive electricity to power companies or produce electricity by themselves, additional problems follow.

In regard to the situation where people sell excessive electricity to the electric system of a power company, please refer to the illustration of FIG. 1A. After people use their own power generation equipment 11 to produce electricity, the generated electricity is transmitted to a power company circuit 15 through a first electricity meter 13. Then, the power company transmits electricity through a second electricity meter 17 to a household circuit 19 for use by electric appliances in people's home. Thus, people can sell the electricity generated by the power generation equipment 11 to the power company for the purpose of reducing electricity fees. However, a power company, when purchasing electricity, generally provides different purchase prices corresponding to different time periods of a day. When the purchase price is below the market price of mains electricity, the electricity generated by the power generation equipment 11 cannot be directly used in the household circuit 19 but still has to be sold to the power company, and the power company will then transmit electricity back to the household circuit 19. This results in a net loss for people buying and selling electricity at different prices. In regard to the situation where people produce and use their own electricity, please refer to the illustration of FIG. 1B. When people use their own power generation equipment 21 to generate electricity, the electricity can be directly transmitted from the power generation equipment 21 to the household circuit 23 for use by the electric appliances in people's home. When the electricity generated by the power generation equipment 21 is insufficient to be supplied to the electric appliances in people's home, the household circuit 23 receives electricity from a power company circuit 27 through an electricity meter 25. In this way, people's electricity expenses can be significantly reduced. However, even though people do not stay home all day, they cannot sell the electricity generated by the power generation equipment 21 back to the power company when power consumption at home is relatively low. In other words, the electricity generated by the power generation equipment 21 either is not always being used or is not in use at all. In the long run, the electricity generated by the power generation equipment 21 is wasted, which lacks economic efficiency.

Hence, it is an important issue nowadays to design an electricity utilization method which combines the advantages of the aforesaid two cases in order to enable stable and adequate supply of electricity and reduction in power waste.

BRIEF SUMMARY OF THE INVENTION

In view of the fact that no electrical equipment is always in operation and need not be turned off as time goes by (such as during working hours or at midnight) or as the number of people using the equipment changes, the power consumption of any electrical equipment typically varies with time. Therefore, after a long-term effort of research and experiment, the inventor finally succeeded in developing a smart socket for automatically switching between electricity utilization modes as disclosed herein. The present invention is intended to provide users with a better electricity utilization experience.

One objective of the present invention is to provide a smart socket for automatically switching between electricity utilization modes. The smart socket can automatically enter a power storage mode or an electricity selling mode according to the user's electricity utilization habits in order to significantly reduce the user's cost of electricity consumption. The smart socket includes a timing unit, a power receiving/output unit, an electricity quantity monitoring unit, a home appliance power supply unit, an electricity selling power supply unit, a switching unit, and a processing unit. The timing unit is able to obtain data of the current time (hereinafter also referred to as the current time data). The power receiving/output unit is connected to a power storage device and an external power supply device, and the power receiving/output unit can receive and output the electricity transmitted from the external power supply device or the power storage device. The electricity quantity monitoring unit is electrically connected to the power receiving/output unit, can receive the electricity output by the power receiving/output unit, and can detect a value of the power flowing through the electricity quantity monitoring unit (the value hereinafter also referred to as the power value). The home appliance power supply unit is connected to a power transmission part, such as a plug, of an electronic device in order to transmit the electricity to the electronic device. The electricity selling power supply unit is electrically connected to an electricity purchaser circuit in order to transmit the electricity to the electricity purchaser circuit. The switching unit is respectively electrically connected to the electricity quantity monitoring unit, the home appliance power supply unit, and the electricity selling power supply unit and is set with a home appliance mode, a power storage mode, and an electricity selling mode. Once the switching unit is switched to the home appliance mode, the electricity quantity monitoring unit is in conduction with the home appliance power supply unit so that the electricity quantity monitoring unit can transmit the electricity to the home appliance power supply unit. Once the switching unit is switched to the electricity selling mode, the electricity quantity monitoring unit is in conduction with the electricity selling power supply unit so that the electricity quantity monitoring unit can transmit the electricity to the electricity selling power supply unit. Once the switching unit is switched to the power storage mode, the electricity quantity monitoring unit is not conduction with any power supply unit but enables the power storage device and the external power supply device to form a loop through which the electricity transmitted from the external power supply device is stored in the power storage device. The processing unit is electrically connected to the timing unit, the electricity quantity monitoring unit, and the switching unit and can switch the mode of the switching unit according to the current time data transmitted from the timing unit and the power value detected by the electricity quantity monitoring unit. Thus, the smart socket of the present invention can automatically switch between different modes according to the current time period or the quantity of power generated by the external power supply unit. When the user is away from home at work, the switching unit is switched to the power storage mode or the electricity selling mode. After the user returns, the switching unit is switched to the home appliance mode.

BRIEF DESCRIPTION THE SEVERAL VIEWS OF THE DRAWINGS

In order for the examiner to have further knowledge and understanding of the objectives, as well as the technical features and their effects, of the present invention, some illustrative embodiments are detailed below with reference to the accompanying drawings, in which.

DETAILED DESCRIPTION OF THE INVENTION

Figure 1A:
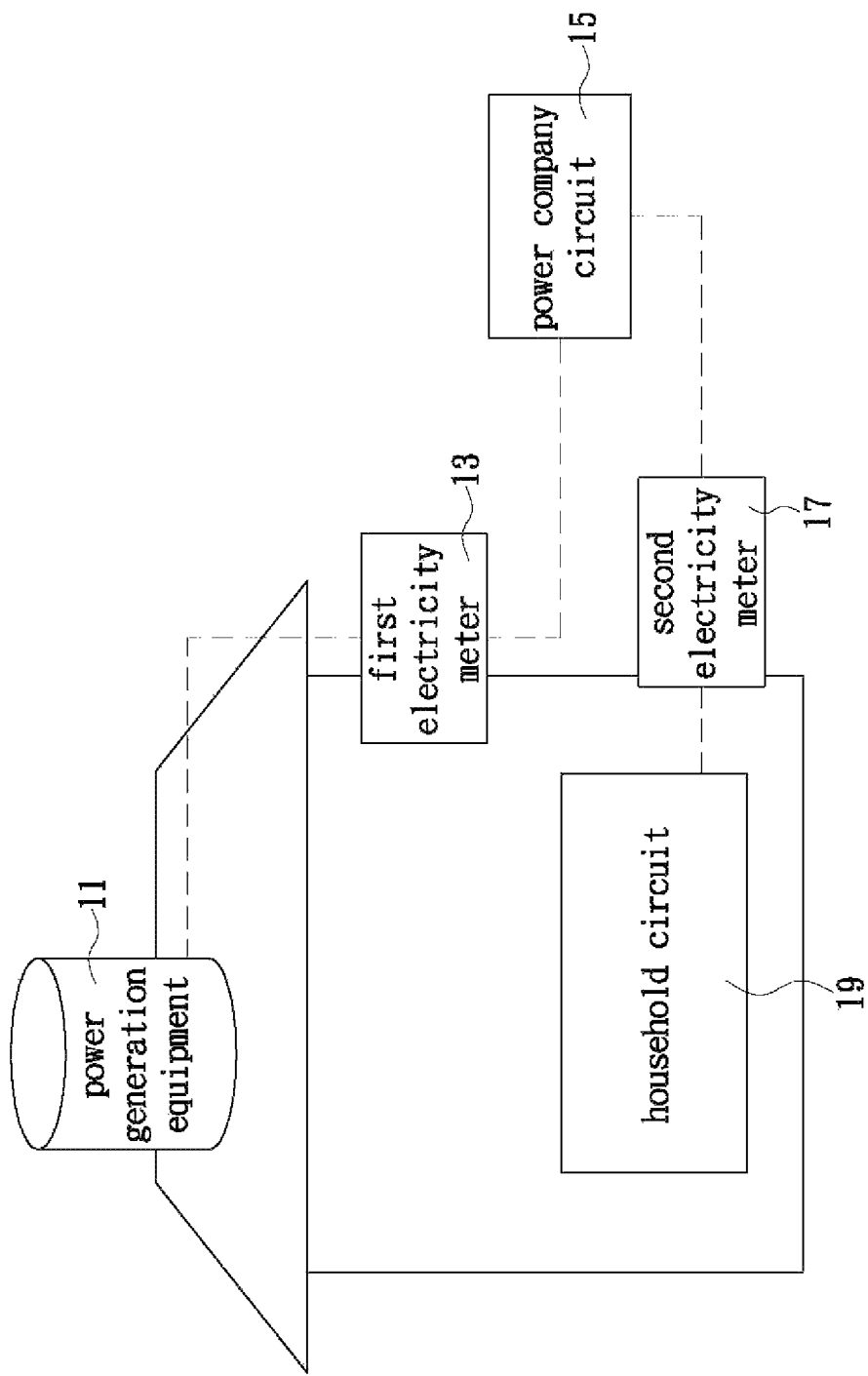
FIG. 1A is a schematic of a conventional power system in which electricity is generated by a household and sold to a power company.
Figure 1B:
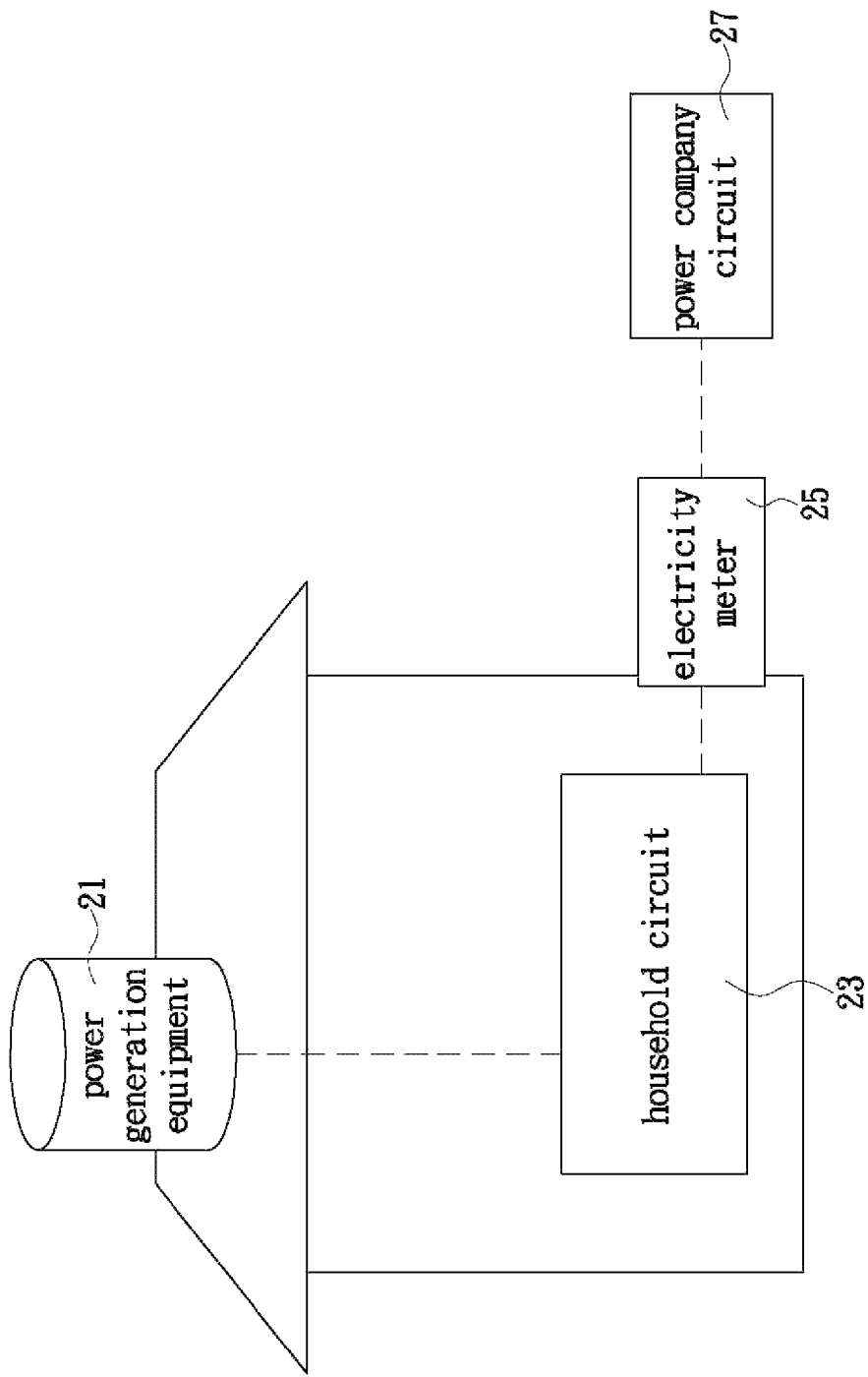
FIG. 1B is a schematic of a conventional power system in which electricity is generated by a household for use by the household.

The present invention relates to a smart socket for automatically switching between electricity utilization modes. Please refer to the illustration of FIG. 2. In one embodiment, the smart socket 3 comprises a timing unit 31, a power receiving/output unit 32, an electricity quantity monitoring unit 33, a home appliance power supply unit 34, an electricity selling power supply unit 35, a switching unit 36, and a processing unit 37, wherein the processing unit 37 is respectively electrically connected to the timing unit 31, the electricity quantity monitoring unit 33, and the switching unit 36 in order to receive information transmitted from the aforementioned units or to transmit control messages to the aforementioned units. The switching unit 36 is connected to the electricity quantity monitoring unit 33, the home appliance power supply unit 34, and the electricity selling power supply unit 35 respectively, wherein the switching unit 36 is set with a home appliance mode, a power storage mode, and an electricity selling mode. The electricity quantity monitoring unit 33 is in conduction with the home appliance power supply unit 34 when the switching unit 36 is switched to the home appliance mode. The electricity quantity monitoring unit 33 is in conduction with the electricity selling power supply unit 35 when the switching unit 36 is switched to the electricity selling mode. The electricity quantity monitoring unit 33 is not in conduction with the home appliance power supply unit 34 or the electricity selling power supply unit 35 when the switching unit 36 is switched to the power storage mode.

Figure 2:
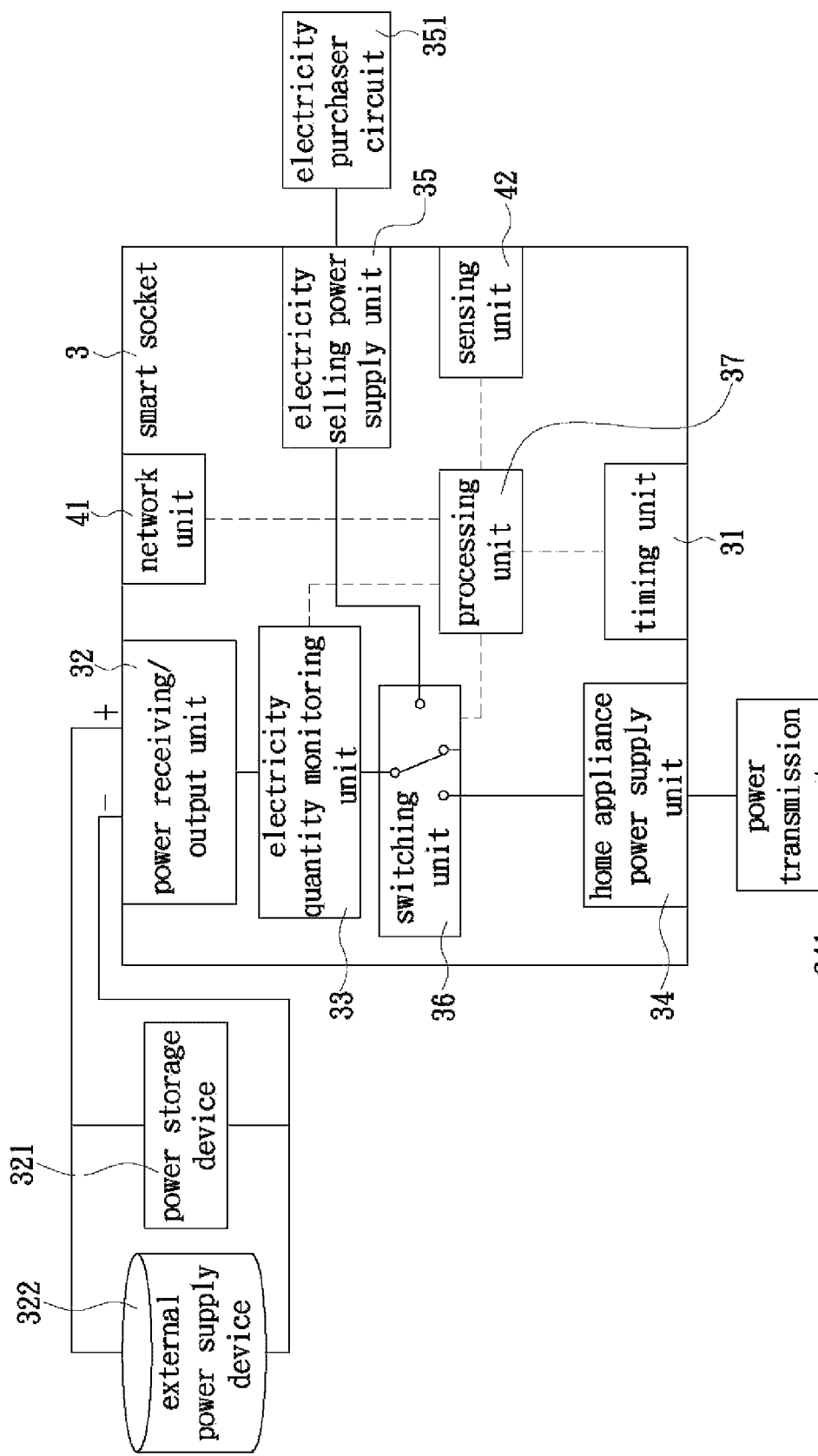
FIG. 2 is a hardware block diagram of the smart socket of the present invention.

Referring to FIG. 2, the timing unit 31 can be connected to the Internet and to a network time protocol server (NTP server) through the Internet to receive data transmitted from the NTP sever of the current time (the data hereinafter also referred to as the current time data) and to transmit the current time data to the processing unit 37. In other embodiments of the present invention, however, the timing unit 31 may have an automatic timing function, which means the user can adjust the time of the timing unit 31 in order for the timing unit 31 to continuously calculate the current time data and to send the calculated current time data to the processing unit 37. Therefore, whether the timing unit 31 obtains the time data from outside through the Internet or obtains the time data by its own calculations, both scenarios should be viewed as feasible with the timing unit 31 of the present invention.

Referring again to FIG. 2, the power receiving/output unit 32 is connected to a power storage device 321 and an external power supply device 322. The external power supply device 322 may be solar, wind, or any other type of power generation equipment and can transmit the electricity generated by itself to the power receiving/output unit 32. The power storage device 321 can also transmit the electricity stored in itself to the power receiving/output unit 32. The power receiving/output unit 32 can output the received electricity. The electricity quantity monitoring unit 33 may be an electricity meter and is electrically connected to the power receiving/output unit 32. The electricity quantity monitoring unit 33 can receive the electricity output by the power receiving/output unit 32 and detect a value of the power flowing through itself, wherein the value is hereinafter also referred to as the power value. When the switching unit 36 is in the power storage mode, the electricity quantity monitoring unit 33 is not in conduction with the home appliance power supply unit 34 or the electricity selling power supply unit 35 but enables the power storage device 321 and the external power supply device 322 to form a loop; consequently, the electricity generated by the external power supply device 322 is stored in the power storage device 321.

With continued reference to FIG. 2, the home appliance power supply unit 34 is connected to a power transmission part 341, such as a plug, of at least one electronic device, such as an air conditioner, a refrigerator, a TV, etc., in order to transmit electricity to the electronic device and thereby drive the electronic device into operation. The electricity quantity monitoring unit 33 is in conduction with the home appliance power supply unit 34 when the switching unit 36 is in the home appliance mode. In this mode, the electricity transmitted from the power receiving/output unit 32 to the electricity quantity monitoring unit 33 is transmitted to the home appliance power supply unit 34 through the electricity quantity monitoring unit 33 so as for the electronic device to receive the electricity through the power transmission part 341. It should be especially mentioned that the power source from which the power receiving/output unit 32 receives the electricity may be either the power storage device 321 or the external power supply device 322. Whether the power storage device 321 or the external power supply device 322 has the priority to provide electricity to the power receiving/output unit 32 can be set according to the user's needs. For example, the power storage device 321 has the priority to provide electricity to the power receiving/output unit 32 until the power storage of the power storage device 321 falls below a threshold. Then, it is the external power supply device 322 that provides electricity to the power receiving/output unit 32. Alternatively, the external power supply device 322 has the priority to provide electricity to the power receiving/output unit 32 until the external power supply device 322 stops generating power. Then, it is the power storage device 321 that provides electricity to the power receiving/output unit 32.

With continued reference to the illustration of FIG. 2, the electricity selling power supply unit 35 is electrically connected to an electricity purchaser circuit 351 in order to transmit electricity thereto, wherein the electricity purchaser circuit 351 may be owned by a power company. The electricity quantity monitoring unit 33 is in conduction with the electricity selling power supply unit 35 when the switching unit 36 is in the electricity selling mode. In this mode, the electricity transmitted from the power receiving/output unit 32 to the electricity quantity monitoring unit 33 is transmitted to the electricity selling power supply unit 35 through the electricity quantity monitoring unit 33 in order to sell the electricity. Since the electricity is transmitted to the electricity selling power supply unit 35 through the electricity quantity monitoring unit 33, the electricity quantity monitoring unit 33 can record how much power is transmitted to the electricity selling power supply unit 35 and transmit the power value to the processing unit 37. In addition, the power source from which the power receiving/output unit 32 receives the electricity may be either the power storage device 321 or the external power supply device 322. Whether the power storage device 321 or the external power supply device 322 has the priority to provide electricity to the power receiving/output unit 32 can be set according to the user's needs.

Please refer to the illustration of FIG. 2 again. The processing unit 37 can receive the current time data transmitted from the timing unit 31 and the power value detected by the electricity quantity monitoring unit 33 and can switch the mode of the switching unit 36. The user may input a predetermined schedule to the processing unit 37 of the smart socket 3 according to their own electricity utilization habits. More specifically, the user may set the schedule through an input unit (not shown) of the smart socket 3 or transmit the schedule to the smart socket 3 through the Internet. For example, assume the period from 8:00 am to 7:00 pm, Monday to Friday is the user's working hours. Therefore, the processing unit 37 can switch the switching unit 36 to the power storage mode or the electricity selling mode during the aforementioned time period, i.e., from 8:00 am to 7:00 pm, Monday through Friday. In the rest of the time, the processing unit 37 can switch the switching unit 36 to the home appliance mode. Thus, the user does not have to manually change the settings frequently, and the processing unit 37 will automatically switch between the modes of the switching unit 36 according to the current time data transmitted from the timing unit 31.

Furthermore, referring to the illustration of FIG. 2 again, in addition to the previously mentioned situations, the processing unit 37 can be so configured as to switch the switching unit 36 to the power storage mode in a low electricity rate period and to the electricity selling mode in a high electricity rate period in order to sell the stored power to the electricity purchaser. In other words, the electricity generated by the external power supply device 322 can be stored instead of being used or sold immediately, and can be sold to the electricity purchaser when the purchase price is high. In the electricity selling mode, the processing unit 37 can further transmit the power value detected by the electricity quantity monitoring unit 33 to the electricity purchaser to save the trouble of reading the electricity meter manually. It should be especially mentioned that, when the timing unit 31 can be connected to the Internet, the processing unit 37 can transmit the power value to the electricity purchaser through the timing unit 31. In situations where the timing unit 31 does not have the function of connecting to the Internet, however, the smart socket 3 may be further installed with a network unit 41, and the processing unit 37 can transmit the power value to the electricity purchaser through the network unit 41. Moreover, since the external power supply device 322 mostly uses renewable energy, such as solar or wind energy, to generate electricity, the quantity of the generated electricity may fluctuate due to different weather conditions. Therefore, the smart socket 3 may be further installed with at least one sensing unit 42, such as an optical sensor or a wind speed sensor. The sensing unit 42 can detect a value corresponding to the current environment, such as brightness or wind speed, and transmit the current environment value to the processing unit 37. The processing unit 37 can then calculate the quantity of the electricity generated by the external power supply device 322 according to the environment value detected by the sensing unit 42, in addition to obtaining the quantity of the sold electricity according to the power value detected by the electricity quantity monitoring unit 33, and reserve in advance the required quantity of electricity for use when the user is at home, i.e., when the switching unit 36 is switched to the home appliance mode. Meanwhile, the purpose of selling excessive electricity can also be achieved. In short, the smart socket 3 of the present invention can automatically switch between different modes according to the current time period or the quantity of the electricity generated by the external power supply device 322, thereby providing a new electricity utilization environment and achieving a maximum economic value.

While the invention herein disclosed has been described by means of specific embodiments, numerous modifications and variations could be made thereto by those skilled in the art without departing from the scope of the invention set forth in the claims.

What is claimed is:

1. A smart socket for automatically switching between electricity utilization modes, comprising:
   a timing unit for obtaining current time data;
   a power receiving/output unit connected to a power storage device and an external power supply device respectively, wherein the power receiving/output unit can receive and output electricity transmitted from the external power supply device or the power storage device;
   an electricity quantity monitoring unit electrically connected to the power receiving/output unit, wherein the electricity quantity monitoring unit can receive the electricity output by the power receiving/output unit and can detect a value of power flowing through the electricity quantity monitoring unit (hereinafter the power value);
   a home appliance power supply unit connected to a power transmission part of an electronic device to transmit the electricity to the electronic device;
   an electricity selling power supply unit electrically connected to an electricity purchaser circuit to transmit the electricity to the electricity purchaser circuit;
   a switching unit respectively electrically connected to the electricity quantity monitoring unit, the home appliance power supply unit, and the electricity selling power supply unit, wherein the switching unit is set with a home appliance mode, a power storage mode, and an electricity selling mode so that, when the switching unit is switched to the home appliance mode, the electricity quantity monitoring unit is in conduction with the home appliance power supply unit so as for the electricity quantity monitoring unit to transmit the electricity to the home appliance power supply unit; when the switching unit is switched to the electricity selling mode, the electricity quantity monitoring unit is in conduction with the electricity selling power supply unit so as for the electricity quantity monitoring unit to transmit the electricity to the electricity selling power supply unit; and when the switching unit is switched to the power storage mode, the electricity quantity monitoring unit is not in conduction with the home appliance power supply unit or the electricity selling power supply unit but enables the power storage device and the external power supply device to form a loop through which the electricity transmitted from the external power supply device is stored in the power storage device; and a processing unit electrically connected to the timing unit, the electricity quantity monitoring unit, and the switching unit, wherein the processing unit can switch the switching unit between the modes according to the current time data transmitted from the timing unit and/or the power value detected by the electricity quantity monitoring unit.

2. The smart socket as claimed in claim 1, wherein the timing unit is connected to the Internet and connected to a network time protocol server (NTP server) through the Internet to receive the current time data transmitted from the time server.

3. The smart socket as claimed in claim 2, wherein the timing unit can output the power value transmitted from the processing unit.

4. The smart socket as claimed in claim 2, further comprising a sensing unit, wherein the sensing unit is electrically connected to the processing unit, and the processing unit can calculate the quantity of electricity generated by the external power supply device according to an environment value detected by the sensing unit.

5. The smart socket as claimed in claim 1, wherein the timing unit can calculate automatically to obtain the current time data.

6. The smart socket as claimed in claim 5, further comprising a network unit, wherein the network unit is connected to the Internet and electrically connected to the processing unit to output the power value transmitted from the processing unit.

7. The smart socket as claimed in claim 5, further comprising a sensing unit, wherein the sensing unit is electrically connected to the processing unit, and the processing unit can calculate the quantity of electricity generated by the external power supply device according to an environment value detected by the sensing unit.

* * * * *